United States Patent [19]

Carter et al.

[11] 3,895,094

[45] July 15, 1975

[54] PROCESS FOR SELECTIVE REDUCTION OF OXIDES OF NITROGEN

[75] Inventors: Jimmy L. Carter, Joplin, Mo.; Michael T. Chapman, Baxter Springs; Bill G. Yoakam, Pittsburg, both of Kans.

[73] Assignee: Gulf Oil Corporation, Pittsburgh, Pa.

[22] Filed: Jan. 28, 1974

[21] Appl. No.: 437,272

[52] U.S. Cl. ............................. 423/239; 423/212
[51] Int. Cl. ...................... B01j 8/00; C01b 21/00
[58] Field of Search ........... 423/235, 239, 237, 328, 423/212, 213.2; 252/451

[56] References Cited
UNITED STATES PATENTS

| | | |
|---|---|---|
| 2,882,243 | 4/1959 | Milton ............................... 423/239 |
| 2,924,504 | 2/1960 | Reitmeier ........................... 423/235 |
| 2,975,025 | 3/1961 | Cohn et al. ........................ 423/239 |
| 3,032,387 | 5/1962 | Andersen et al. ................... 423/235 |
| 3,403,975 | 10/1968 | Frilette .............................. 423/328 |
| 3,689,212 | 9/1972 | Petit et al. ......................... 423/239 |
| 3,691,099 | 9/1972 | Young ............................... 423/328 |

*Primary Examiner*—Oscar R. Vertiz

[57] ABSTRACT

Oxides of nitrogen are selectively removed from air-polluting exhaust gases from nitric acid manufacturing plants by reaction with preferably a stoichiometric amount of ammonia in the presence of an acid-resistant aluminosilicate molecular sieve composition as catalyst.

2 Claims, No Drawings

PROCESS FOR SELECTIVE REDUCTION OF OXIDES OF NITROGEN

DESCRIPTION OF THE INVENTION

Nitrogen oxides are undesirable components of exhaust gases from a variety of industrial processes, particularly those in which nitric acid is manufactured or is used to etch metals, oxidize organic substances or for other purposes. In lesser amounts, nitrogen oxides are also present in exhaust gases from internal combustion engines.

Various techniques have been proposed for removing nitrogen oxides from gas streams and preventing the pollution of the atmosphere with these substances. Reduction of the nitrogen oxides with ammonia or hydrogen in the presence of such catalysts as nickel and oxides of iron and chromium has been proposed. (U.S. Pat. No. 2,381,696; U.S. Pat. No. 3,008,796; German Pat. No. 1,259,298.) The reaction is exothermic and control of temperature in the catalyst bed is difficult, so that combustion of the ammonia is likely to occur.

Removal of nitrogen oxides from tail gas streams of nitric acid plants has been attempted by reaction with ammonia, hydrogen or methane over a catalyst consisting of a supported metal of the platinum group. See, for example, Anderson et al, Ind. Eng. Chem. vol. 53 p. 199 (1961); Adlhart et al, Chem Eng. Progr. vol. 67 p. 73–78 (1971). This method can be used with a relatively small catalyst bed and a low pressure drop so that the reactor may be located prior to the tail gas turbines, using ammonia purge gas as the reducing agent. In actual practice, however, there has been difficulty with control of the exothermic reaction, resulting in pressure surges, overheating of the reactor and damage to tail gas turbines from catalyst particles. An inherent disadvantage of the method is that some hydrogen cyanide may be produced as a by-product and this must be removed from the exhaust gas by subsequent treatment. The use of methane as a reducing agent in a process of this type often results in fouling of the catalyst with carbon deposits.

The most obvious means of reducing nitrogen oxide emissions is to do a more efficient job of absorbing them in the course of nitric acid manufacture, possibly then removing the small amount of nitrogen oxides from the tail gas stream by adsorption or scrubbing. In practice it has been found prohibitively expensive to increase absorption efficiency to the point at which the nitrogen oxide level in the tail gas is less than 500 ppm. [D. J. Newman Chem. Eng. Progr. vol. 67 p. 79–84 (1971)].

More recently, it has been proposed to adsorb nitrogen oxides from nitric acid plant tail gas with molecular sieve adsorbents, periodically regenerating the adsorbents, and recovering and recycling the nitrogen oxides to nitric acid manufacture. This technique requires a large investment for the rather bulky adsorption and regeneration equipment. [(Joithe et al, Ind. Eng. Chem. Process Des. Develop. vol. 11, p. 434–439 (1972.)]

We have discovered that instead of employing large quantities of molecular sieves to trap and contain the nitrogen oxides, it is more efficient and economical to use only catalytic amounts of molecular sieves and destroy the nitrogen oxides by reduction with ammonia. Briefly, our invention consists of a process for selectively reducing oxides of nitrogen in a mixture of gases containing from a trace to 10 percent oxygen, from a trace to 2 percent nitric oxide, from a trace to 2 percent nitrogen dioxide and the remainder an inert gas, which comprises contacting in a reaction zone said mixture of gases and an approximately stoichiometric amount of ammonia based on moles of nitrogen oxides present at a space velocity of less than 60,000 and a temperature within the range of 200°C to 300°C in the presence of a catalyst consisting of an acid resistant aluminosilicate molecular sieve composition having substantially uniform intercrystalline pores with effective diameters of at least 6 A., whereby selective reduction of the oxides of nitrogen is effected. We have found that with the use of the molecular sieves as catalyst the reaction may be easily regulated and kept under control and the catalyst has a long life. The process is described in detail in the following discussion and illustrative examples.

THE CATALYST

The acid-resistant molecular sieves which are suitable for use in the present process may be made by known methods, for example the process outlined in Chemical Engineering vol. 66 No. 16 p. 104 (1959) and disclosed in U.S. Pat. No. 2,882,243. This method of manufacture ordinarily involves reaction of sodium silicate with sodium aluminate, crystallization, washing, filtering, mixing with a suitable binder, such as a clay, extrusion and cutting into rods, pellets or other shapes, drying and activation at about 650°C in a rotary kiln. Acid resistance is obtained by maintaining a high theoretical $SiO_2/Al_2O_3$ ratio in the composition, preferably about 10/1. Preferably the sodium ion is displaced in the finished product by acid treatment to yield the acid form of the molecular sieve. Although varying proportions of metallic ions such as zinc and chromium may also be incorporated in the catalyst by ion exchange, this may increase catalyst activity to the point at which the exothermic process becomes difficult to control. In general, ease of control is to be preferred over economies in catalyst cost which result from increased activity.

Adsorptive surface is the property of the catalyst which is most important. Desirable catalysts have a surface area of at least 350 $m^2/g$ and preferably about 400 to 450 $m^2/g$. The useful adsorptive surface consists primarily of intercrystalline pores which are substantially uniform and have effective diameters of at least 6 A. Because the adsorptive surface is internal the catalyst has a low bulk density, usually from 35 to 50 $lb/ft^3$. This low bulk density can lead to fluidization and attrition loss in high velocity gas streams. To prevent this from occurring it is preferred, in the best mode of operation, to use a shallow bed of catalyst of relatively large area so that low gas velocities may be employed, with low pressure drop across the catalyst bed.

OPERATING TEMPERATURE

If operation of the process below 200°C is attempted there is a possibility that ammonium nitrate may accumulate in some area in which the gas stream is cooler, particularly near walls where heat loss occurs, creating an explosion hazard. At temperatures above 300°C there is rapid decline in the efficiency of the process, so that a larger amount of ammonia is required, much of it being merely wasted by combustion.

The apparatus employed and the operation of the process on a semi-commercial scale to remove nitrogen oxides from a tail gas stream in a nitric acid plant are described below.

DESCRIPTION OF REACTOR EQUIPMENT

To the tail gas turbine stack for a nitric acid unit there is attached a semi-commercial reactor by means of a side-jack joined by a Y-shaped branch to the main stack.

The side-stack reactor is a circular vessel with a diameter of 5 ft. and a corresponding cross-sectional area of 19.625 ft.$^2$. Incremental volume of catalyst held by the reactor is 1.635 ft.$^3$/inch of bed depth. The catalyst material is supported on a double eight mesh screen, with larger mesh screens, grating and angle pieces to support the smaller eight mesh screen. An impingement plate is located just below the catalyst bed to provide good distribution of the gases through the vessel. Ammonia is sparged into the 2 ft. diameter side-stack several feet below the reactor vessel. This allows time for thorough mixing of the ammonia and tail gases. Gas sample lines and thermocouples are located above and below the reactor.

The main stack is 2 ft. in diameter and has a butterfly control valve located just above the point where the side-stack joins. This valve can be used to force increased tail gas flow through the side-stack. Sample collecting conduits are located above and below the butterfly valve. A thermocouple is located in the main stack at a point below the joining of the side-stack.

DETAILS OF TAIL GAS ANALYSIS AND FLOW

Tail gas from the acid units flow through the tail gas turbine and then into the main stack. Flow volume varies slightly from day to day and averages about 20,000 ft.$^3$/minute at standard conditions of 60°F (15.6°C) and 1 atmosphere pressure absolute. On the average, the tail gas contains 1,100 ppm nitrogen dioxide (NO$_x$), 2,500 ppm nitric oxide (NO), and .5 to 1.0 percent by volume oxygen (O$_2$) with the remainder being nitrogen (N$_2$), water and trace elements present in air. Temperature of this gas as it leaves the tail gas turbine varies from 240° to 260°C or 464° to 500°F. Pressure at the exit of the turbine is about 6 inches of water.

DESCRIPTION OF THE SELECTIVE REDUCTION PROCESS

In the selective reduction process nitrogen oxides are selectively reduced to nitrogen and water with ammonia (NH$_3$) in the presence of oxygen. The reactions are as follows:

$6NO + 4NH_3 \rightarrow 5N_2 + 6H_2O \quad \Delta F = -73.2$ KCal/gram Mole NO$_x$ $6NO_2 + 8NH_3 \rightarrow 7N_2 + 12H_2O \quad \Delta F = -121.5$ KCal/gram Mole NO$_x$ The reaction of NO$_x$ with ammonia is more or less independent of pressure but dependent on their ratio, reacting according to stoichiometric proportions. Heat of reaction is exothermic. Assuming a gas with 1,100 ppm of NO$_2$ and 2,500 ppm of NO, the temperature rise of the gas due to complete reaction would be as follows:

T due to 1,100 ppm of NO$_2$ = 18.1°F or 10.1°C
T due to 2,500 ppm of NO = 41.1°F or 22.8°C
Total T increase = 59.2°F or 32.9°C Greater or lesser concentrations of NO$_x$ will give proportionally higher or lower respective temperature rises. Assuming again the above NO$_2$ and NO concentrations and a flow of 1,000 ft.$^3$ of gas at standard conditions, the quantity of ammonia required per hour to stoichiometrically react with all NO and NO$_2$ is as follows:

NO$_2$ — 5.16 lb/hr. = .112 lb moles/hr.
NO — 11.67 lb/hr. = .389 lb moles/hr.
Total NO + NO$_2$ = .501 lb moles/hr.
Moles of ammonia needed to react with NO = 4/6 × .389 = .259 moles/hr.
Moles of ammonia needed to react with NO$_2$ = 8/6 × .112 = .149 moles/hr.
Total moles of ammonia needed to react with NO = NO$_2$ = .408 moles/hr.

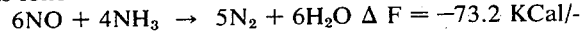

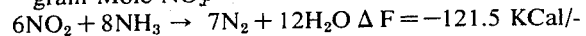

Space velocities (ft.$^3$ of gas at standard conditions per ft.$^3$ of catalyst per hour) should be less than 60,000 and the range from 3,000 to 30,000 may be expected to provide most practical and efficient reaction.

OPERATING THE SIDE-STACK REACTOR

The particles of molecular sieve catalyst used in the reactor have physical dimensions of 1/16 in. diameter × ¼ in. to ½ in. in length and a bulk density of 47 lbs./ft.$^3$. The material is chemically a synthetic, crystalline aluminosilicate with a 10 to 1 ratio of silica to alumina and is very resistant to acid attack. The crystalline material has an effective pore size of 8–9 A.

Although this rather large pore size allows molecules like ammonia to pass readily through (ammonia has a critical diameter of 3.8 A.), such molecules are most likely adsorbed by a phenomenon of polarity. Other molecules with strong dipole moments are similarly adsorbed. Most likely, ammonia and nitrogen oxides are adsorbed and react when adjacent to each other on the molecular sieve internal catalyst surface.

At the beginning of use of the side stack reactor approximately five inches or 8.2 ft.$^3$ of catalyst was charged to the reactor vessel. To prevent the small pellets from falling through the support screen, it was necessary to first place three-fourths in. of iron oxide ammonia synthesis catalyst into the reactor vessel. Then 5 inches of molecular sieve catalyst was added, followed by a 4 mesh screen and another inch of ammonia synthesis catalyst. This last inch of ammonia synthesis catalyst was added because of its high density, to help weight the low density molecular sieves. The screen was necessary to prevent the heavier synthesis catalyst from migrating down through the molecular sieves.

On the following day, after the acid unit was placed into operation, flow through the side-stack appeared to be rather low and was estimated to be 2,000 ft.³/minute. The butterfly valve on main stack was wide open. This flow rate was later confirmed by Pitot tube measurement to be about 2,000 ft.³/minute. This flow rate corresponds to a space velocity of 15,000. Temperatures averaged 191°C above and 224°C below the reactor, respectively. Main stack temperature averaged about 248°C. Pressure drop across the reactor was 2.2 inches of water.

Even though the temperature above the reactor was rather low, ammonia flow (100% ammonia, no air) was initiated and temperatures were monitored. After about an hour, the temperature above the reactor had increased from 191°C to 219°C, while the temperature below the reactor had decreased from 224°C to 220C. Temperature decrease below the reactor was mainly due to the fact that the main stack temperature had decreased from 247°C to 243°C. The ammonia flow also has a slight cooling effect. If the difference between below and above reactor temperatures are compared both before and after ammonia flow was initiated, it can be seen that temperature increase of 32°C was achieved as a result of chemical reaction. In the meantime, the brown-orange color of exhaust gases had been observed to gradually diminish in intensity until it was nearly invisible.

Three days later the reactor was operated for a period of 6½ hours. During this time samples were taken and tests were made to determine the percent of $NO_x$ being removed. Results were as follows:

|  | Above Reactor | Below Reactor | Percent Removed |
|---|---|---|---|
| ppm $NO_x$ | 260 | 6,520 | 96 |
| ppm NO | 0 | 5,050 | 100 |
| ppm $NO_2$ | 260 | 1,470 | 82 |

Ammonia flow averaged 7.2 ft.³/minute.

During the last two hours of the period, the ammonia flow was increased to 10 ft.³/minute to see what would result. The result of use of this greater than stoichiometric amount of ammonia was a loss of efficiency and the formation of ammonium nitrate near the top of the stack. Two things appear to happen when excess ammonia is used:
1. The bed absorbs large quantities of ammonia which reduces the sites for $NO_x$ adsorption and thus retards reaction.
2. The excess ammonia reacts with nitrogen oxides to form ammonium nitrate.

After the white ammonium nitrate plume had been observed in the exhaust gases for a few minutes, the ammonia was shut off. It took nearly 10 minutes for the white plume to disappear and the brown plume to start to reappear. If the bed was not adsorbing ammonia, the gas flow should have swept it from the reactor and stack in less than 5 seconds. Therefore, it is obvious that the molecular sieves have a tremendous capacity to adsorb, and as long as excess ammonia is not introduced, this characteristic appears to be the main factor in promoting the desired reduction reactions.

On a subsequent occasion ammonia was again turned on for a longevity test to see if any deactivation of the catalyst occurs in continuous use. The test proceeded for 311 hours with no indication of reduced activity.

During a shut down of acid manufacturing units for maintenance, approximately 2½ inches of catalyst were removed from the reactor. This left about 2½ inches of catalyst remaining. Removing the catalyst caused the rate of gas flow through the vessel to increase from 2,000 ft.³/minute to 2,600 ft.³/minute. The reduction in catalyst bed depth and increased gas rate brought about an increase of space velocity from 15,000 to 40,000. From observation of the plume from the stack it appeared that the increased space velocity had a detrimental effect on the efficiency of the reaction. The plume appeared to be more evident than before part of the catalyst was removed. The system was operated under the above-described conditions for an additional 246 hours with no apparent reduction of catalyst activity.

In pilot plant tests, prior to the operation of the semi-commercial reactor, the effect of oxygen on the reactions was determined. Fifty percent air (10% oxygen) seemed to nearly stop the reaction while 20 percent air (4% oxygen) seemed to have only a slightly detrimental effect. Lesser amounts appeared to have little or no effect.

We claim:

1. A process for selectively reducing oxides of nitrogen to nitrogen in a mixture of gases containing from a trace to 10 percent oxygen, from a trace to 2 percent nitric oxide, from a trace to 2 percent nitrogen dioxide and the remainder an inert gas, which comprises contacting in a reaction zone said mixture of gases and an approximately stoichiometric amount of ammonia based on moles of nitrogen oxides present at a space velocity of less than 60,000 and a temperature within the range of 200°C to 300°C in the presence of a catalyst consisting of an acid resistant aluminosilicate molecular sieve composition having a surface area of at least 350 m²/g and substantially uniform intercrystalline pores with effective diameters of at least 6 A., whereby selective reduction of the oxides of nitrogen to nitrogen is effected.

2. A process for selectively reducing oxides of nitrogen to nitrogen in a mixture of gases containing from a trace to 10 percent oxygen, from a trace to 2 percent nitric oxide, from a trace to 2 percent nitrogen dioxide and the remainder an inert gas, which comprises contacting in a reaction zone said mixture of gases and an approximately stoichiometric amount of ammonia based on moles of nitrogen oxides present at a space velocity of 3,000 to 30,000 and a temperature within the range of 200°C to 300°C in the presence of a catalyst consisting of an acid resistant aluminosilicate molecular sieve composition having a theoretical silica to alumina ratio of 10, a surface area of at least 350 m²/g and substantially uniform intercrystalline pores with effective diameters of 8 to 9 A., whereby selective reduction of the oxides of nitrogen to nitrogen is effected.

* * * * *

Notice of Adverse Decision in Interference

In Interference No. 99,622, involving Patent No. 3,895,094, J. L. Carter, M. T. Chapman and B. G. Yoakam, PROCESS FOR SELECTIVE REDUCTION OF OXIDES OF NITROGEN, final judgment adverse to the patentees was rendered July 16, 1979, as to claim 2.

[*Official Gazette November 20, 1979.*]